(12) United States Patent
Su

(10) Patent No.: US 10,015,491 B2
(45) Date of Patent: Jul. 3, 2018

(54) IN-LOOP BLOCK-BASED IMAGE RESHAPING IN HIGH DYNAMIC RANGE VIDEO CODING

(71) Applicant: DOLBY LABORATORIES LICENSING CORPORATION, San Francisco, CA (US)

(72) Inventor: Guan-Ming Su, Fremont, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 15/563,901

(22) PCT Filed: Mar. 30, 2016

(86) PCT No.: PCT/US2016/025082
§ 371 (c)(1),
(2) Date: Oct. 2, 2017

(87) PCT Pub. No.: WO2016/164235
PCT Pub. Date: Oct. 13, 2016

(65) Prior Publication Data
US 2018/0124399 A1 May 3, 2018

Related U.S. Application Data

(60) Provisional application No. 62/143,478, filed on Apr. 6, 2015.

(51) Int. Cl.
| H04N 19/136 | (2014.01) |
| G06T 5/00 | (2006.01) |
| H04N 19/124 | (2014.01) |
| H04N 19/176 | (2014.01) |
| G06T 7/40 | (2017.01) |
| H04N 19/70 | (2014.01) |
| H04N 19/182 | (2014.01) |
| H04N 19/169 | (2014.01) |

(Continued)

(52) U.S. Cl.
CPC ......... H04N 19/117 (2014.11); H04N 19/124 (2014.11); H04N 19/82 (2014.11); H04N 19/85 (2014.11); H04N 19/91 (2014.11)

(58) Field of Classification Search
CPC .... H04N 19/117; H04N 19/124; H04N 19/82; H04N 19/85; H04N 19/91
USPC ....................................... 375/240.12, 240.03
See application file for complete search history.

(56) References Cited

FOREIGN PATENT DOCUMENTS

| JP | 2011-176407 | 9/2011 |
| WO | 2007/139534 | 12/2007 |

(Continued)

OTHER PUBLICATIONS

Zhang Y. et al., "Perception-based high dynamic range video compression with optimal bit-depth transformation", 2011 18th IEEE International Conference on Image Processing (ICIP), pp. 1321-1324, XP032079831, Sep. 11, 2011.

(Continued)

Primary Examiner — Hee-Yong Kim

(57) ABSTRACT

Systems and methods are disclosed for in-loop, region-based, reshaping for the coding of high-dynamic range video. Using a high bit-depth buffer to store input data and previously decoded reference data, forward and backward, in-loop, reshaping functions allow video coding and decoding to be performed at a target bit depth lower than the input bit depth. Methods for the clustering of the reshaping functions to reduce data overhead are also presented.

15 Claims, 6 Drawing Sheets

(51) Int. Cl.
*H04N 19/186* (2014.01)
*H04N 19/117* (2014.01)
*H04N 19/85* (2014.01)
*H04N 19/91* (2014.01)
*H04N 19/82* (2014.01)

(56) References Cited

FOREIGN PATENT DOCUMENTS

| | | |
|---|---|---|
| WO | 2013/103522 | 7/2013 |
| WO | 2014/160705 | 10/2014 |
| WO | 2014/204865 | 12/2014 |
| WO | 2016/140954 | 9/2016 |

OTHER PUBLICATIONS

ITU, "Reference electro-optical transfer function for flat panel displays used in HDTV studio production", ITU-R BT. 1886, p. 1-5, Mar. 2011.

SMPTE Standard, "High Dynamic Range Electro-Optical Transfer Function of Mastering Reference Displays", SMPTE ST 2084:2014, pp. 1-14, Aug. 16, 2014.

Stessen J. et al "Chromaticity Based Color Signals for Wide Color Gamut and High Dynamic Range" ISO/IEC JTC1/SC29/WG11 MPEG2014/M35065, Oct. 2014, pp. 1-18.

IN-LOOP BLOCK-BASED IMAGE RESHAPING IN HIGH DYNAMIC RANGE VIDEO CODING

CROSS-REFERENCE TO RELATED APPLICATIONS

This application claims priority to U.S. Provisional Patent Application No. 62/143,478, filed on Apr. 6, 2015, which is incorporated herein by reference in its entirety.

TECHNOLOGY

The present invention relates generally to images. More particularly, an embodiment of the present invention relates to in-loop, block-based image reshaping, for images and video sequences with high dynamic range.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where $n \le 8$ (e.g., color 24-bit JPEG images) are considered images of standard dynamic range, while images where $n>8$ may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the adaptive, in-loop reshaping of high-dynamic range images in video coding are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
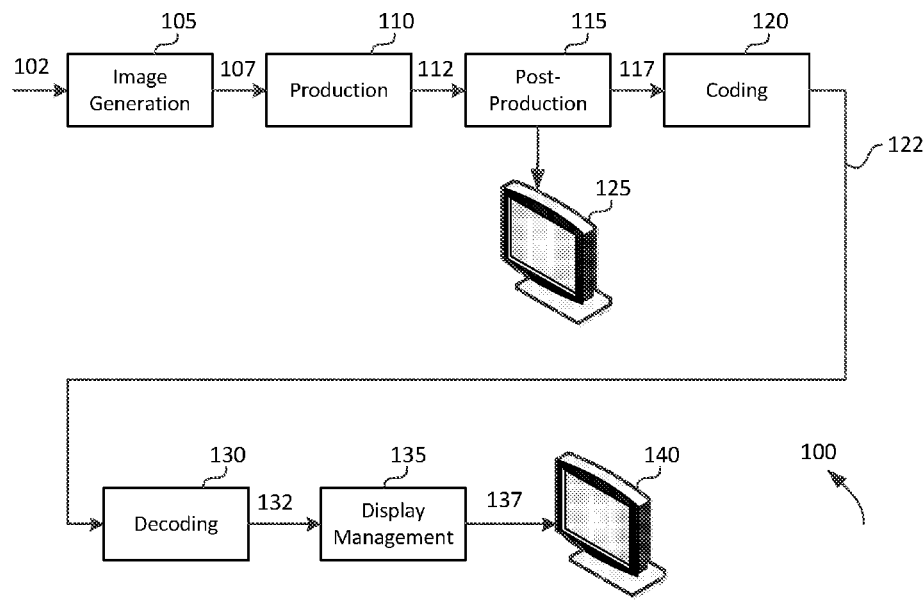
FIG. 1A depicts an example process for a video delivery pipeline.

Techniques for in-loop adaptive reshaping during the compression of high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the in-loop, block-based, reshaping during the coding (e.g., compression and decompression) of HDR images. In an embodiment, an encoder accesses an HDR input image in an input bit depth. For a coding region of the input image, the encoder generates or selects a forward reshaping function and a backward reshaping function. The encoder accesses reference pixel data in the input bit depth for the region to be coded and applies the forward reshaping function to the reference pixel data and to pixel data of the coding region to generate second reference data and second coding region pixel data in a target bit depth, wherein the target bit depth is equal or lower than the input bit depth. The encoder generates a coded bit stream in the target bit depth based on the second reference data and the second coding region pixel data. The encoder also generates reconstructed data based on the in-loop decoding of the coded bitstream. The backward reshaping function is then applied to the reconstructed data to generate future reference data in the input bit depth. Data characterizing the forward and/or backward reshaping functions for the coding region may also be signaled to a decoder as part of the coded bit stream.

In another embodiment, a decoder accesses a coded bit stream in a target bit depth and metadata characterizing forward reshaping functions and/or a backward reshaping functions for each coded region in the coded bitstream. For a coded region in the coded bitstream, the decoder accesses reference data in an output bit depth, wherein the output bit depth is equal or larger than the target bit depth. A forward reshaping function and a backward reshaping function are assigned to the coded region based on the input metadata. A forward reshaping function is applied to the reference data to generate second reference data in the target bit depth. The decoder generates decoded pixel data in the target bit depth for the coded region based on the coded bitstream data and the second reference data. A backward reshaping function is applied to the decoded pixel data to generate output data and future reference data in the output bit depth.

In an embodiment, generating or selecting a forward reshaping function for a coding region comprises: dividing the input image into coding regions, clustering the coding regions into G groups, where G is less than the total number of the total coding regions in the image, generating a forward reshaping function and a backward reshaping function for each of the G groups and selecting one of the G sets of forward and backward reshaping functions for the coding region according to a selection criterion.

Example Video Delivery Processing Pipeline

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping or Quantization

Currently, most digital interfaces for video delivery, such as the Serial Digital Interface (SDI), are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 $cd/m^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In an embodiment, a perceptual quantizer function maps linear input gray levels to output gray levels that better match the contrast sensitivity thresholds in the human visual system. An examples of PQ mapping functions (or EOTFs) is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 cd/m², one 12-bit code value corresponds to a relative change of approximately 0.0048 cd/m²; however, at 1,000 cd/m², one 12-bit code value corresponds to a relative change of approximately 2.24 cd/m². This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames of a video), there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Adaptive PQ" for short, denote methods to adaptively adjust the perceptually quantization of images based on their content.

Figure 1B:
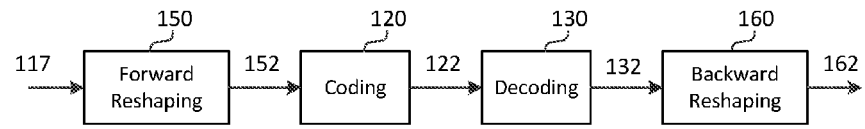
FIG. 1B depicts an example process for data compression using out-of-loop adaptive quantization or reshaping and de-quantization.

FIG. 1B depicts an example process for "out-of-loop" Adaptive PQ or reshaping, as described in U.S. Provisional Patent Application Ser. No. 62/126,925, filed on Mar. 2, 2015, to be referred to as the '925 Application. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by a backward reshaping function (160), which converts the re-quantized frames (132) back to the original EOTF domain (e.g., gamma or PQ), for further downstream processing, such as the display management process (135) discussed earlier. An example of generating a backward reshaping function is described in U.S. Provisional Application Ser. No. 62/136,402, filed on Mar. 20, 2015, to be referred to as the '402 Application.

In-Loop Image Reshaping

Figure 2A:
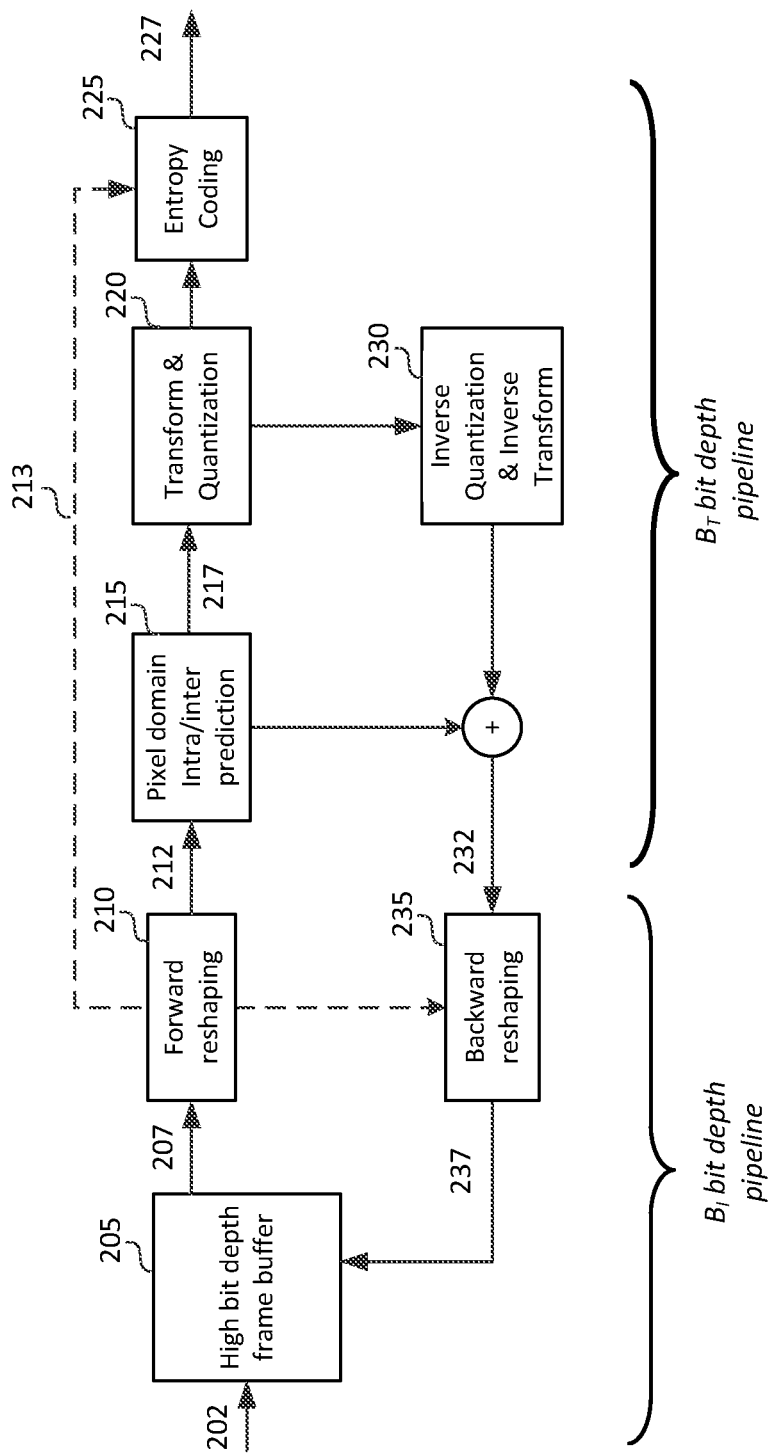
FIG. 2A depicts an example system for in-loop forward reshaping in a video encoder according to an embodiment of this invention.

FIG. 2A depicts an example system (200A) for in-loop reshaping in a video encoder according to an embodiment of this invention. As depicted in FIG. 2A, a sequence of high-dynamic range images (e.g., video frames) (202) (e.g., captured at 12 or 16 bits per color component), are stored in a high bit depth frame buffer (205). A video encoder (e.g., an MPEG-2, MPEG-4, AVC, HEVC, etc., encoder) comprises inter/intra prediction (215) which generates either intra-coded blocks or residuals (217). The output (217) of the prediction process (215) is subsequently translated into a suitable transform domain (e.g., DCT) and is quantized (220). Finally, after quantization (220), an entropy encoder (225) uses lossless coding techniques (e.g., Huffman coding, arithmetic coding, and the like) to generate a compressed bitstream (227). Most standard-based encoders (e.g., AVC, HEVC, and the like) include an in-loop decoding process, where after applying an inverse quantization and inverse transform processes (230), an approximation of the input bitstream (232) is generated as it will be seen by a downstream decoder. Due to the high cost of designing high bit-depth encoders and decoders, commercially available video encoders may constrain the supported bit depth to about 8 to 10 bits. To better encode HDR inputs using low-cost encoders, forward reshaping unit (210) may convert the output (207) of the high bit depth buffer from the original input bit depth $B_I$ (e.g., 12 or 16 bits) to a target bit depth $B_T$ (e.g., 8 or 10 bits). In some embodiments it may be beneficial to apply reshaping and restrict the signal dynamic range even if the target bit depth is the same as the input bit depth. For example, reshaping may improve overall compression efficiency or reshaping may target generating content for displays of a specific dynamic range. All parameters related to forward reshaping or quantization (210) may be communicated to a downstream decoder (e.g., 200B) via metadata (213) so that the decoder may generate a backward reshaping function, similar to backward reshaping block (235) in the encoder.

Note that the major difference between in-loop reshaping (210) and traditional reshaping (150) is that in-loop reshaping operates inside the video encoder (120). It is expected that in-loop reshaping will yield better performance due to better exploring local characteristics of the input video. In an HDR image, the dynamic range may vary across the various regions of the image. For example, in an example test sequence, for a given frame, at the global level, the difference between the global max and min luminance values was 46,365; however, across all 8×8 non overlapping blocks, the maximum difference between block-based max and min luminance values was 34,904, which allows for a significantly lower bit-depth requirement on a per block basis.

As reshaping parameters may be adjusted more frequently, in-loop reshaping may require higher metadata overhead to pass the appropriate parameters to a decoder to generate the forward and backward reshaping functions. In this invention, novel mapping methods are proposed which reduce this overhead for improved coding efficiency and higher image quality.

Figure 2B:
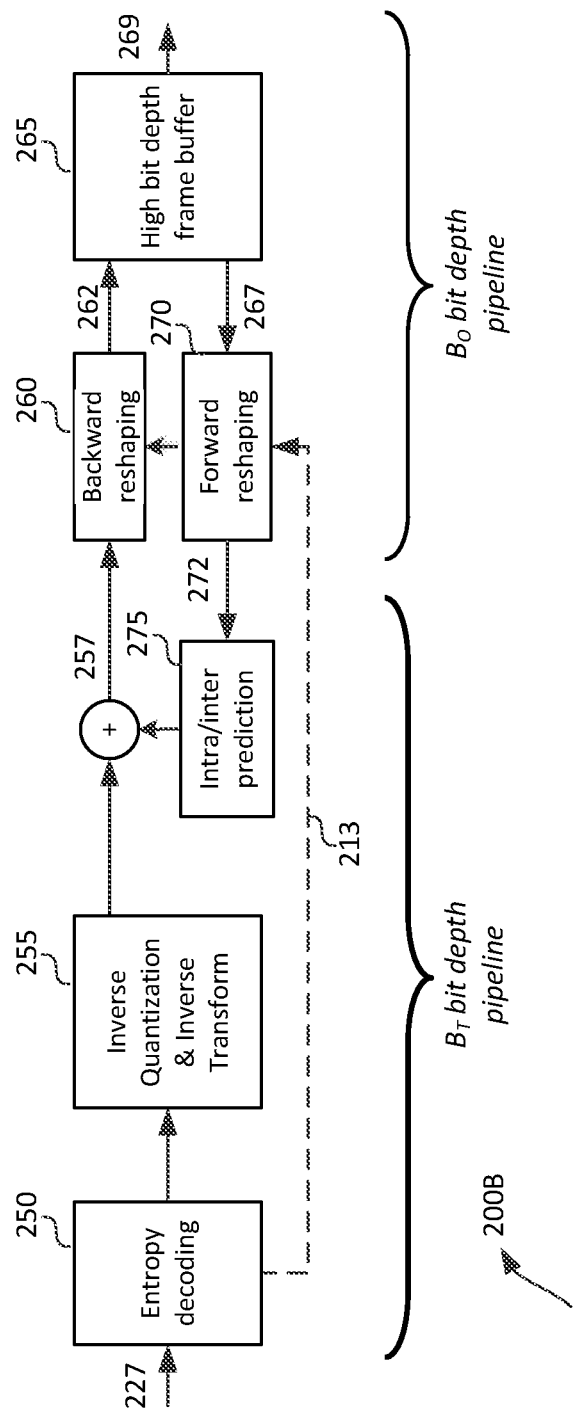
FIG. 2B depicts an example system for in-loop backward reshaping in a video decoder according to an embodiment of this invention.

FIG. 2B depicts an example system (200B) for backward in-loop reshaping in a video decoder. Given the input compressed bitstream (227) coded in a target bit depth ($B_T$), the decoder performs entropy decoding (250), inverse quantization and transformation (255), and intra/inter prediction (275) to generate a decoded signal (257) in the target bit depth $B_T$ (e.g., 8 or 10 bits). This signal represents an approximation of signal (212) generated by the encoder after applying forward reshaping. Intra/inter prediction (275) may require access to previously decoded reference pixels (267) stored in high bit depth (e.g., $B_O$) frame buffer (265). Reference pixels (267) in bit-depth $B_O$ are translated to reference data (272) in the target bit depth ($B_T$) using a forward reshaping function (270). Legacy decoders may display directly signal 257; however, high-dynamic range decoders may apply backward reshaping (260) to generate a high-dynamic range signal (262, 269) in bit depth $B_O$ approximating the original HDR signal (202). In an embodiment, backward reshaping (260) in the decoder matches backward reshaping (235) in the encoder. Similarly, forward reshaping (270) in the decoder matches forward reshaping (210) in the encoder. In other embodiments, the forward and backward reshaping functions in the decoder (200B) may be close approximations of the corresponding functions in the encoder (200A).

As in the encoder, most of the video decoding processing is done in the target bit depth ($B_T$) and only the backward and forward reshaping functions need to be performed in a higher bit depth. In the following sections, forward and backward reshaping techniques will be described for intra or inter prediction. As an example, specific details are discussed for a simple, linear, reshaping function; however, it should be obvious to a person with ordinary skills in the art on how to apply the proposed techniques to alternative non-linear or adaptive quantization and reshaping schemes.

Figure 3A:
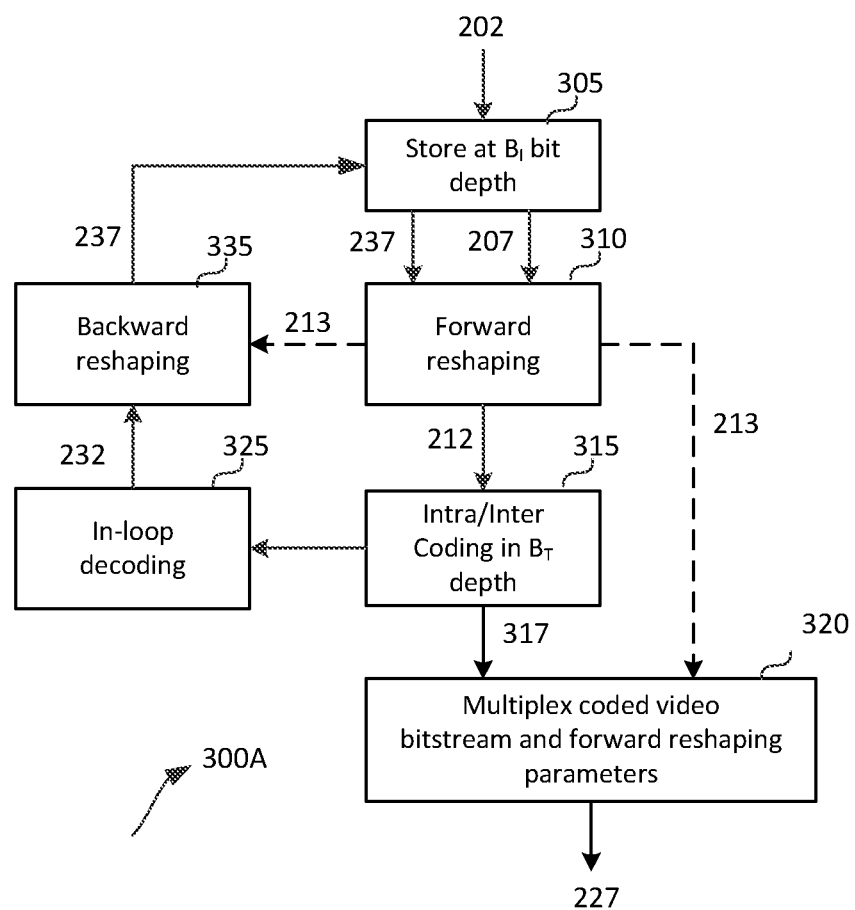
FIG. 3A depicts an example process for in-loop forward reshaping in a video encoder according to an embodiment of this invention.

FIG. 3A depicts an example process (300A) for forward in-loop reshaping according to an embodiment. In step (305), an input HDR image (202) (e.g., a frame in a sequence of frames) is stored in high bit-depth ($B_I$) memory (e.g., 205). The image (202) is sub-divided into coding regions (e.g., macroblocks, coding tree units, etc.). Then for each coded region (207), the following steps may be performed:

In step (310), a forward reshaping transform converts the image region to be coded (207) and any related reference data (237) from the input bit depth ($B_I$) to a target bit depth ($B_T$). Parameters (213) related to the forward reshaping transform may be used to generate a backward reshaping transform (335.

In step (315), the output of step (310) is coded using a video encoder (e.g., MPEG-4, AVC, HEVC, etc.) For example, video coding steps may include intra or inter prediction (315), transformation and quantization (220), and entropy coding (225).

Step (325) comprises the traditional in-loop decoding in video coding (e.g., inverse quantization and inverse transform) to generate reconstructed signal (232) as will be generated by a corresponding downstream decoder (e.g., 200B). After a backward reshaping step (335), reconstructed data (232) are translated back to the $B_I$ bit-depth and stored in a frame buffer to be used as reference data (237) in the coding of future coding regions.

Finally, in step (320), the forward reshaping function parameters (213) and the output (317) of the video encoder are multiplexed to create a coded bit stream.

This process may be repeated for all coded regions of the input (202) and for one or more color components (e.g., Luma and Chroma) of the input signal. Metadata (213) may include parameters related to only the forward reshaping function, only the backward reshaping function (which allows to derive both a forward and a backward reshaping function), or both the forward and backward functions.

Figure 3B:
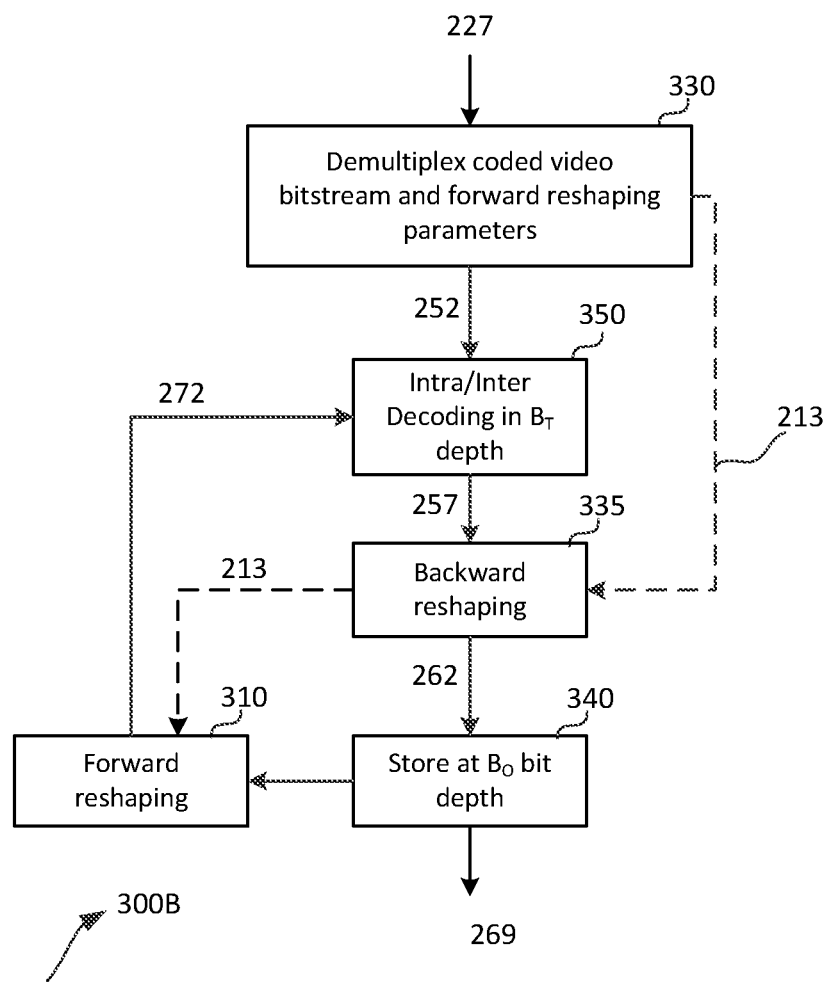
FIG. 3B depicts an example process for in-loop backward reshaping in a video decoder according to an embodiment of this invention.

Given a coded bitstream (227) in a target bit depth $B_T$ (e.g., 8 or 10 bits), FIG. 3B depicts an example decoding process (300B) according to an embodiment. In step (330), the decoder demultiplexes the input bitstream (227) to generate a coded bitstream (252) and reshaping-related metadata (213). The reshaping parameters (213) are used to build a backward reshaping function (335) and a forward reshaping function (310) that match the corresponding functions used by an encoder (e.g., 200A or 300A). Next, for each coded region in the coded bitstream (252), a decoded region is generated as follows:

In step (350), the coded region in target bit-depth $B_T$ is decoded according to the coding parameters specified in the bitstream. Such decoding may require applying entropy decoding, inverse transform and quantization and/or intra or inter prediction as known in the art. In order to accommodate intra or inter-based decoding at bit-depth $B_T$, all reference data required for decoding (e.g., pixel data from previously decoded reference regions), which have been stored in a $B_O \geq B_T$ bit depth, are converted back to the $B_T$ bit depth using a forward reshaping step (310).

In step (335), the decoded signal (257) is converted back to a signal with bit-depth $B_O$ using the backward reshaping transform. Then, in step (340), the high-bit-depth signal (262) is stored in a high-bit-depth buffer (e.g., 265).

Typically, $B_O = B_I$, the original HDR bit depth used in the encoder; however, in some embodiments while $B_O$ is typically larger than $B_T$, $B_O$ and $B_T$ may be different (e.g., $B_I > B_O > B_T$).

Additional details for intra or inter prediction are provided in the next sections.

In-Loop Reshaping for Intra Prediction

Figure 4:
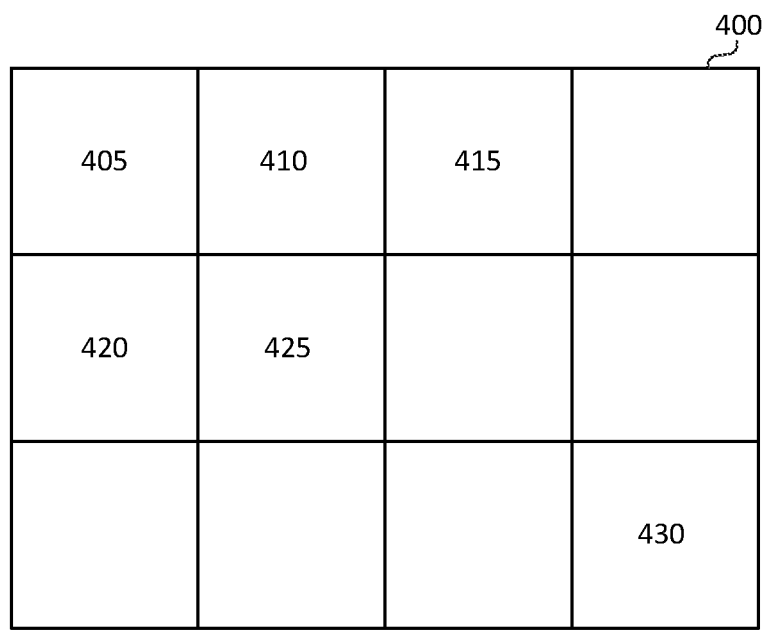
FIG. 4 depicts an image frame sub-divided into coding regions.

FIG. 4 depicts an example of an image frame (400) subdivided into non-overlapping coding regions (e.g., 405, 410, 415). Such regions may correspond to blocks, macroblocks, coding tree blocks, slices, and the like. Without loss of generality, such regions may all be equal (say, 32×32) or unequal. In intra prediction, pixels of the current region or block in a frame are predicted based on pixels from previously encoded neighbor regions within the same frame, without reference to any pixels of other frames. In an embodiment, let $L_{(m,n),j}$ denote the (m,n) HDR region located on the m-th column and n-th row within the j-th frame, with m=0, n=0, located at the top left corner. HDR pixels within such a region, with bit-depth $B_I$, are denoted as $v_{(m,n),j}(x,y)$. Let $F_{(m,n),j}()$ denote the forward reshaping function for this region and let $B_{(m,n),j}()$ denote the corresponding backward reshaping function. Denote the reshaped or quantized pixels (212) in the target bit-depth $B_T$ as $$s_{(m,n),j}(x,y) = F_{(m,n),j}(v_{(m,n),j}(x,y)). \quad (1)$$

Then, the reconstructed pixels (237) from the backward reshaping function may be denoted as $$\hat{v}_{(m,n),j}(x,y) = B_{(m,n),j}(\hat{s}_{(m,n),j}(x,y)). \quad (2)$$

The construction of the forward reshaping function $F_{(m,n),j}()$ needs to take into consideration the dynamic range for all pixels within the current region $L_{(m,n),j}$, plus the dynamic range of all reference pixels in the neighbor regions. In an embodiment, there are five different scenarios according to the position of the current block within the frame:

No neighbor is available. For example, the current block is at the top-left corner of the frame (e.g., current block is block (405)).

A single left neighbor is available (e.g., current block is block (410) or (415)), then $\hat{v}_{(m-1,n),j}(x,y)$ pixels are available.

Top and top-right only neighbors are available (e.g., current block is block (420)), then $\hat{v}_{(m,n-1),j}(x,y)$ and $\hat{v}_{(m+1,n-1),j}(x,y)$ pixels are available.

Left, top-left, top, and top-right only neighbors are available (e.g., current block is block (425)), then pixels $\hat{v}_{(m-1,n-1),j}(x,y)$, $\hat{v}_{(m,n-1),j}(x,y)$, $\hat{v}_{(m+1,n-1),j}(x,y)$, and $\hat{v}_{(m-1,n),j}(x,y)$ are available.

Left, top-left, and top only neighbors are available (e.g., current block is block (430)), then pixels $\hat{v}_{(m-1,n-1),j}(x,y)$, $\hat{v}_{(m,n-1),j}(x,y)$, and $\hat{v}_{(m-1,n),j}(x,y)$ are available.

Let $\Theta_{(m,n),j}$ denote the set of pixels serving as prediction references from the available reconstructed neighbor blocks. In an embodiment, the first step comprises determining the entire dynamic range for pixels in both $L_{(m,n),j}$ and $\Theta_{(m,n),j}$. Let $\Omega_{(m,n),j} = \Theta_{(m,n),j} \cup L_{(m,n),j}$ denote the union of all these pixels. In an embodiment, let $$v^H_{(m,n),j} = \max\{v_{(m,n),j}(x, y) \in \Omega_{(m,n),j}\}, \quad (3)$$

$$v^L_{(m,n),j} = \min\{v_{(m,n),j}(x, y) \in \Omega_{(m,n),j}\}$$

denote the maximum and minimum pixel values within $\Omega_{(m,n),j}$. Let $s_{(m,n),j}^H$ and $s_{(m,n),j}^L$ denote the corresponding minimum and maximum pixel values in the target bit depth. In some embodiments, these values may be constant for an entire frame or even an entire scene or the whole video sequence. For example, in an embodiment, $s_{(m,n),j}^L = 0$ and $s_{(m,n),j}^H = 255$ for $B_T = 8$ and $s_{(m,n),j}^H = 1023$ for $B_T = 10$, e.g. it represents the maximum possible legal value. As an example, assuming a linear stretch method, the forward reshaping function may be expressed as:

$$F_{(m,n),j} = (s^H_{(m,n),j} - s^L_{(m,n),j}) \frac{v_{(m,n),j}(x, y) - v^L_{(m,n),j}}{v^H_{(m,n),j} - v^L_{(m,n),j}} + s^L_{(m,n),j}. \quad (4)$$

A decoder, may reconstruct the backward reshaping function if it knows the input and output boundary points (e.g., $v_{(m,n),j}^H$ and $v_{(m,n),j}^L$); however, such an implementation may introduce a lot of overhead and thus reduce overall coding efficiency. In an embodiment, this overhead may be reduced by using a pre-determined clustering of the shaping parameters into groups.

Consider K (e.g., K=1024, 8096, etc.) intervals of $v_{(m,n),j}^H$ and $v_{(m,n),j}^L$ values, such as those defined by rounding them as $$K \cdot \lfloor (v^H_{(m,n),j}/K) + 1 \rfloor, \text{ and } K \cdot \lfloor v^L_{(m,n),j}/K \rfloor. \quad (5)$$

These rounded values may be further clustered into G groups, where each group is represented by a representative value according to an optimization criterion. For example, in an embodiment, a K-mean clustering algorithm can be used to minimize the clustering distortion subject to the constraint that the representative value of $K \cdot \lfloor (v_{(m,n),j}^H/K)+1 \rfloor$ in one group should be the maximal value in that group and the representative value of $K \cdot \lfloor v_{(m,n),j}^L/K \rfloor$ in one group should be the minimal value in that group. For example, if $\Psi_{g,j}$ denotes the set of $L_{(m,n),j}$ blocks in group g, then representative values may be computed as $$v^H_{g,j} = \max\{K \cdot \lfloor (v^H_{(m,n),j}/K)+1 \rfloor, \forall (m, n, j) \in \Psi_{g,j}\}, \quad (6)$$

$$v^L_{g,j} = \min\{K \cdot \lfloor v^L_{(m,n),j}/K \rfloor, \forall (m, n, j) \in \Psi_{g,j}\}.$$

The number G of groups represents a trade-off between accuracy of representing the dynamic range within a region and overhead. The representative values may be stored in a table accessed through a group index (say, g), such as g=0, 1, 2, G−1. These representative values may be further coded using any of the known in the art lossless coding techniques. Note also that since for each frame, there is a finite number of G clusters, these can be pre-computed at the beginning of each frame as will be discussed in more detail later on. Similar techniques may be applied to other reshaping schemes, such as those described in the '925 Application.

The backward reshaping function is needed in both the encoder and decoder and is generated based on the parameters of the forward reshaping function. For example, for the linear reshaping function of equation (4), the inverse reshaping function may be computed as $$B_{(m,n),j} = (v^H_{(m,n),j} - v^L_{(m,n),j}) \frac{\hat{s}_{(m,n),j}(x, y) - s^L_{(m,n),j}}{s^H_{(m,n),j} - s^L_{(m,n),j}} + v^L_{(m,n),j}. \quad (7)$$

In other embodiments, a backward reshaping function may be approximated through a piece-wise linear or non-linear polynomial. The coefficients of these polynomials may be transmitted from the encoder to the decoder as metadata (213). In case of cluster-based forward reshaping functions, for each time interval of interest (e.g., a frame or a scene), for each one of the G clusters in the encoder, a corresponding look-up table (LUT) may be generated for backward reshaping, hence the correct backward reshaping function may easily be identified. Table 1A provides an example summary of the steps required for in-loop, intra-prediction, according to an embodiment. The corresponding decoding steps are listed in Table 1B.

Table 1A: Encoding process for in-loop reshaping in Intra prediction

//Intra-prediction encoder for each current region or block to be encoded
1. Extract the un-encoded current block $L_{(m,n),j}$ from the high bit depth frame buffer.
2. Extract the reconstructed available neighbor block(s) $\Theta_{(m,n),j}$ from the high bit depth frame buffer.
3. Construct the forward reshaping function $F_{(m,n),j}(\ )$ and the corresponding backward reshaping function $B_{(m,n),j}(\ )$.
4. Convert un-encoded current block $L_{(m,n),j}$ and reconstructed available neighbor block(s) $\Theta_{(m,n),j}$ to the reshaped domain via forward reshaping function:

$$s_{(m,n),j}(x,y) = F_{(m,n),j}(v_{(m,n),j}(x,y)) \forall v_{(m,n),j}(x,y) \in \Theta_{(m,n),j} \cup L_{(m,n),j}.$$

5. Perform intra-prediction as defined by the video encoder (e.g. DC, horizontal, vertical, planar prediction in AVC and angular prediction in HEVC). Denote the predicted value as $\bar{s}_{(m,n),j}(x,y)$.
6. Generate the prediction error (residual) as $r_{(m,n),j}(x,y) = s_{(m,n),j}(x,y) - \bar{s}_{(m,n),j}(x,y)$.
7. Encode the residual using the video encoder, (e.g., using transform coding, quantization, and entropy coding). Denote the reconstructed residual as $\hat{r}_{(m,n),j}(x,y)$.

8. Calculate the reconstructed signal in the reshaped domain as $\hat{s}_{(m,n),j}(x,y) = \bar{s}_{(m,n),j}(x,y) + \hat{r}_{(m,n),j}(x,y)$.
9. Perform the backward reshaping to convert the reconstructed signal back to the high bit-depth domain $\hat{v}_{(m,n),j}(x,y) = B_{(m,n),j}(\hat{s}_{(m,n),j}(x,y))$.
10. Copy the converted high bit depth reconstructed pixels back to high bit depth frame buffer. Those pixels will be served as reference pixels for future blocks or regions to be encoded.

Table 1B: Decoding process for in-loop reshaping in Intra prediction
// Intra-prediction, decoder
for each current region or block to be decoded
1. Extract the reconstructed available neighbor block(s) $\Theta_{(m,n),j}$ from the high bit depth frame buffer.
2. Construct the forward reshaping function $F_{(m,n),j}(\ )$ and backward reshaping function $B_{(m,n),j}(\ )$ based on received metadata from the encoder.
3. Convert reconstructed available neighbor block(s) $\Theta_{(m,n),j}$ to the reshaped domain via forward reshaping function:

$$s_{(m,n),j}(x,y) = F_{(m,n),j}(v_{(m,n),j}(x,y)) \forall v_{(m,n),j}(x,y) \in \Theta_{(m,n),j}.$$

4. Perform intra-prediction as defined in the decoder (e.g., DC, horizontal, vertical, planar prediction in AVC and angular prediction in HEVC). Denote the predicted value as $\bar{s}_{(m,n),j}(x,y)$.
5. Decode the residual from the bitstream through entropy decoding, inverse quantization, and inverse transform. Get the reconstructed residual as $\hat{r}_{(m,n),j}(x,y)$.
6. Calculate the reconstructed signal in the reshaped domain as $\hat{s}_{(m,n),j}(x,y) = \bar{s}_{(m,n),j}(x,y) + \hat{r}_{(m,n),j}(x,y)$.
7. Perform the backward reshaping to convert the reconstructed signal back to the high bit depth domain $\hat{v}_{(m,n),j}(x,y) = B_{(m,n),j}(\hat{s}_{(m,n),j}(x,y))$.
8. Copy the converted high bit depth reconstructed pixels back to high bit depth frame buffer. Those pixels will be served as reference pixels for future blocks or regions to be decoded.

end

To reduce the overhead in transmitting forward-reshaping-related parameters, as discussed earlier, one may constrain the maximum possible sets of forward and backward reshaping functions (e.g., to G). Tables 2A and 2B provide example summaries of the steps required for in-loop, intra-prediction, encoding and decoding, according to an embodiment.

Table 2A: Encoding process for in-loop reshaping using a group ID in Intra prediction
//Intra prediction, encoder
// collect statistics
for each current block/region to be encoded
1. Extract the un-encoded current block $L_{(m,n),j}$ from the high bit depth frame buffer.
2. Extract the reconstructed available neighbor block(s) $\Theta_{(m,n),j}$ from the high bit depth frame buffer.
3. Obtain $K \cdot \lfloor (v_{(m,n),j}^H/K)+1 \rfloor$ and $K \cdot \lfloor v_{(m,n),j}^L/K \rfloor$.
end
// construct the group reshaping functions
1. Separate blocks into several blocks via some optimization method.
2. Construct the forward reshaping function, $F_{g,j}(\ )$ and backward reshaping function $B_{g,j}(\ )$ in each group.
3. Assign each block a group ID g.
// perform in-loop reshaping intra-prediction
for each current region or block to be encoded
1. Extract the un-encoded current block $L_{(m,n),j}$ from the high bit depth frame buffer.
2. Extract the reconstructed available neighbor block(s) $\Theta_{(m,n),j}$ from the high bit depth frame buffer.
3. Construct the forward reshaping function $F_{(m,n),j}(\ )$ and backward reshaping function $B_{(m,n),j}(\ )$ by checking the group ID. Entropy code this group ID into bitstream.
4. Convert un-encoded current block $L_{(m,n),j}$ and reconstructed available neighbor block(s) $\Theta_{(m,n),j}$ to the reshaped domain via forward reshaping function:

$$s_{(m,n),j}(x,y) = F_{(m,n),j}(v_{(m,n),j}(x,y)) \forall v_{(m,n),j}$$
$$(x,y) \in \Theta_{(m,n),j} \cup L_{(m,n),j}.$$

5. Perform intra-prediction. Denote the predicted value as $\bar{s}_{(m,n),j}(x,y)$.
6. Generate the prediction error (residual) as $r_{(m,n),j}(x,y) = s_{(m,n),j}(x,y) - \bar{s}_{(m,n),j}(x,y)$.
7. Encode the residual using the video encoder, (e.g., using transform coding, quantization, and entropy coding). Get the reconstructed residual as $\hat{r}_{(m,n),j}(x,y)$.
8. Calculate the reconstructed signal in the reshaped domain as $\hat{s}_{(m,n),j}(x,y) = \bar{s}_{(m,n),j}(x,y) + \hat{r}_{(m,n),j}(x,y)$.
9. Perform the backward reshaping to convert the reconstructed signal back to the high bit depth domain $\hat{v}_{(m,n),j}(x,y) = B_{(m,n),j}(\hat{s}_{(m,n),j}(x,y))$.
10. Copy the converted high bit depth reconstructed pixels back to high bit depth frame buffer. Those pixels will be served as reference pixels for future blocks or regions to be encoded.

end

Table 2B: Decoding process for in-loop reshaping using a group ID in Intra prediction
// perform in-loop reshaping intra-prediction
for each current region or block to be decoded
1. Extract the reconstructed available neighbor block(s) $\Theta_{(m,n),j}$ from the high bit depth frame buffer.
2. Construct the forward reshaping function $F_{(m,n),j}(\ )$ and backward reshaping function $B_{(m,n),j}(\ )$ by checking the group ID from the bitstream.
3. Convert reconstructed available neighbor block(s) $\Theta_{(m,n),j}$ to the reshaped domain via forward reshaping function:

$$s_{(m,n),j}(x,y) = F_{(m,n),j}(v_{(m,n),j}(x,y)) \forall v_{(m,n),j}(x,y) \in \Theta_{(m,n),j}.$$

4. Perform intra-prediction as defined in existing codec standard. Denote the predicted value as $\bar{s}_{(m,n),j}(x,y)$.
5. Decode the residual from the bitstream through entropy decoding, inverse quantization, and inverse transform. Get the reconstructed residual as $\hat{r}_{(m,n),j}(x,y)$.
6. Calculate the reconstructed signal in the reshaped domain as $\hat{s}_{(m,n),j}(x,y) = \bar{s}_{(m,n),j}(x,y) + \hat{r}_{(m,n),j}(x,y)$.
7. Perform the backward reshaping to convert the reconstructed signal back to the high bit depth domain $\hat{v}_{(m,n),j}(x,y) = B_{(m,n),j}(\hat{s}_{(m,n),j}(x,y))$.
8. Copy the converted high bit depth reconstructed pixels back to high bit depth frame buffer. Those pixels will be served as reference points for future blocks or regions to be decoded.

end

In-Loop Reshaping for Inter Prediction

As used herein, the term "inter coding" denotes the coding of a coding region in a picture using coding elements (such as samples values and motion vectors) outside of the picture. In inter coding, pixels in the current picture may be coded based on pixels in prior and/or future frames in display order using motion estimation and motion compensation. Let j+r be the reference frame for a region $L_{(m,n),j}$ in the j-th frame, where r is a positive or negative integer. The collocated block may be denoted as $L_{(m,n),j+r}$. Let $\Gamma_{mv_{(m,n),(j,j+r)},j+r}$ denote the set of pixels associated with a motion vector $mv_{(m,n),(j,j+r)}$ used to predict pixels in the $L_{(m,n),j}$ region. Assume the motion vector search window in the reference frame, which have size $W_x + W_y$ (such as 64×64). Denote the pixel set in that windows as $\Gamma_{(m,n),(j,j+r)}$. Assuming, without limitation, a forward reshaping function that depends on the dynamic range of the pixels within the reference block, as before, minimum and maximum pixel values may be computed as:

$$v_{(m,n),j}^H = \max\{v_{(m,n),j}(x, y) \in \{L_{(m,n),j} \cup \Gamma_{(m,n),(j,j+r)}\}\}, \quad (8)$$

$$v_{(m,n),j}^L = \min\{v_{(m,n),j}(x, y) \in \{L_{(m,n),j} \cup \Gamma_{(m,n),(j,j+r)}\}\}.$$

In an embodiment, forward and backward reshaping functions may be generated according to equations (4) and (7). After converting the current block and the reference blocks into the reshaped domain, the video encoder may generate a residual which will be coded using the tools of the legacy encoder, e.g., by applying transform coding, quantization, and entropy coding.

As in the intra-prediction mode, clustering techniques may be applied to reduce the overhead related to the parameters for the forward and backward reshaping functions. Tables 3A and 3B provide example summaries of the steps required for in-loop, inter-prediction, encoding and decoding, according to an embodiment.

Table 3A: Encoding process for in-loop reshaping using a group ID in Inter prediction
//Inter prediction, encoding
// Collect statistics
For each block/region to be encoded
 1. Extract the un-encoded current block $L_{(m,n),j}$ from the high bit depth frame buffer.
 2. Extract the reconstructed motion vector search window $\Gamma_{(m,n),(j,j+r)}$ from the high bit depth frame buffer.
 3. Obtain $K \cdot \lfloor (v_{(m,n),j}^H/K)+1 \rfloor$ and $K \cdot \lfloor v_{(m,n),j}^L/K \rfloor$ from $L_{(m,n),j}$ and $\Gamma_{(m,n),(j,j+r)}$.
end
// Construct group reshaping function
 1. Separate blocks into groups via some optimization method.
 2. Construct the forward reshaping function, $F_{g,j}()$ and backward reshaping function $B_{g,j}()$ in each group.
 3. Assign each block a group ID g.
// Perform in-loop reshaping inter-prediction
for each current region or block to be encoded
 1. Extract the un-encoded current block $L_{(m,n),j}$ from the high bit depth frame buffer.
 2. Extract the reconstructed motion vector search window $\Gamma_{(m,n),(j,j+r)}$ from the high bit depth frame buffer for frame j+r.
 3. Construct the forward reshaping function $F_{(m,n),j}()$ and backward reshaping function $B_{(m,n),j}()$ by checking the group ID. Entropy encode this group ID and multiplex it into the coded bitstream.
 4. Convert un-encoded current block $L_{(m,n),j}$ and reconstructed available motion vector search window $\Gamma_{(m,n),(j,j+r)}$ to the reshaped domain via forward reshaping function:

$$s_{(m,n),j}(x,y)=F_{(m,n),j}(v_{(m,n),j}(x,y)) \forall v_{(m,n),j}(x,y) \in L_{(m,n),j}$$

$$s'_{(m,n),j+r}(x,y)=F_{(m,n),j}(v_{(m,n),j+r}(x,y)) \forall v_{(m,n),j}(x,y) \in \Gamma_{(m,n),(j,j+r)}.$$

5. Perform motion estimation to find the optimal motion vector, $mv_{(m,n),(j,j+r)}$, for block $\{s_{(m,n),j}(x,y)\}$ on search window $\{s'_{(m,n),j+r}(x,y)\}$ in the reshaped domain. Denote the predicted value using motion compensation as $\bar{s}_{(m,n),j}(x,y)$.
 6. Generate the prediction error (residual) as $r_{(m,n),j}(x,y)=s_{(m,n),j}(x,y)-\bar{s}_{(m,n),j}(x,y)$.
 7. Encode the residual using the video encoder, such as by transform coding, quantization, and entropy coding. Get the reconstructed residual as $\hat{r}_{(m,n),j}(x,y)$.
 8. Calculate the reconstructed signal in reshaped domain as $\hat{s}_{(m,n),j}(x,y)=\bar{s}_{(m,n),j}(x,y)+\hat{r}_{(m,n),j}(x,y)$.
 9. Perform the backward reshaping to convert signal back to high bit depth domain $\hat{v}_{(m,n),j}(x,y)=B_{(m,n),j}(\hat{s}_{(m,n),j}(x,y))$.
 10. Copy the converted high bit depth reconstructed pixels back to high bit depth frame buffer. Those pixels will be served as reference pixels for future blocks or regions to be encoded.
end Table 3B: Decoding process for in-loop reshaping using a group ID in Inter prediction
//Inter-prediction, decoder
// Perform in-loop reshaping inter-prediction
for each current region or block to be decoded
 1. Extract the reconstructed block $\Gamma_{mv_{(m,n),(j,j+r)},j+r}$ in frame j+r pointed by motion vector $mv_{(m,n),(j,j+r)}$ at frame j+r from the high bit depth frame buffer.
 2. Construct the forward reshaping function $F_{(m,n),j}()$ and backward reshaping function $B_{(m,n),j}()$ by checking the group ID from bitstream.
 3. Convert reconstructed motion vector search window $\Gamma_{mv_{(m,n),(j,j+r)},j+r}$ to the reshaped domain via forward reshaping function:

$$s'_{(m,n),j+r}(x,y)=F_{(m,n),j}(v_{(m,n),j+r}(x,y)) \forall v_{(m,n),j}(x,y) \in \Gamma_{mv_{(m,n),(j,j+r)},j+r}.$$

4. Perform motion compensation (inter-prediction) by given the motion vector decoded from bit stream. Denote the predicted value as $\bar{s}_{(m,n),j}(x,y)$.
 5. Decode the residual from the bitstream through entropy decoding, inverse quantization, and inverse transform. Get the reconstructed residual as $\hat{r}_{(m,n),j}(x,y)$.
 6. Calculate the reconstructed signal in reshaped domain as $\hat{s}_{(m,n),j}(x,y)=\bar{s}_{(m,n),j}(x,y)+\hat{r}_{(m,n),j}(x,y)$.
 7. Perform the backward reshaping to convert signal back to high bit depth domain $\hat{v}_{(m,n),j}(x,y)=B_{(m,n),j}(\hat{s}_{(m,n),j}(x,y))$.
 8. Copy the converted high bit depth reconstructed pixels back to high bit depth frame buffer. Those pixels will be served as reference pixels for future blocks or regions to be decoded.
end Clustering Reshaping Functions As mentioned earlier, by restricting the number of reshaping functions (e.g., to G total), one may reduce the overhead required to communicate to the decoder the parameters related to reconstruct the forward and backward reshaping functions. Examples of such grouping or clustering schemes are presented in this Section.

Consider first a reshaping function that may be fully determined by the minimum and maximal pixel values within a coding region of interest (e.g., $v_{(m,n),j}^H$, $v_{(m,n),j}^L$). To facilitate the discussion, let $$\alpha_{c,j} = K \cdot \lfloor (v_{(m,n),j}^H / K) + 1 \rfloor, \quad (9)$$

$$\beta_{c,j} = K \cdot \lfloor (v_{(m,n),j}^L / K) \rfloor.$$

where c=1, 2, . . . , C, represents a unique index to each (m,n) region.

In an embodiment, let $$\gamma_{c,j} = f(a_{c,j}, b_{c,j}),$$

denote a function of the $a_{c,j}$ and $b_{c,j}$ values, such as their difference (e.g., $a_{c,j} - b_{c,j}$), their ratio (e.g., $a_{c,j}/b_{c,j}$), their log ratio, and the like. In some embodiments the $\gamma_{c,j}$ function may also be determined according to other representative values of the pixel region c, such as the mean, median, variance, standard deviation, or entropy of the pixels in the region.

Clustering Based on Sorting

In an embodiment, clustering is based on: a) sorting $\alpha_{c,j}$, $\beta_{c,j}$, or $\gamma_{c,j}$, and then b) partitioning all sorted C blocks into G groups (G<C). For example, let $\Psi_{g,j}$ denote group g, where g=0, 1, 2, . . . , G−1, then the extreme pixels values in each group may determine the boundary values for each group reshaping function. For example, in an embodiment, $\alpha_{c,j}$ values may be sorted in ascending order. Let $\{t_0, t_1, \ldots, t_{C-1}\}$ denote the sorting order of each block. The first group, $\Psi_{0,j}$, with blocks with indices $\{t_0, t_1, \ldots, t_{(C/G)-1}\}$ has the lowest value $\alpha^{(0)}$ corresponding to the $\alpha_{c,j}$ value for block $t_0$. The second group, $\Psi_{1,j}$, with blocks with indices $\{t_{(C/G)}, t_{(C/G)+1}, \ldots, t_{2(C/G)-1}\}$ has lowest value $\alpha^{(1)}$ corresponding to the $\alpha_{c,j}$ value for block $t_{(C/G)}$. The last group, with blocks with block indices $\{t_{((G-1)C/G)}, t_{((G-1)C/G)+1}, \ldots, t_{(C-1)}\}$ has the lowest value $\alpha^{(G-1)}$ corresponding to the $\alpha_{c,j}$ for block $t_{((G-1)C/G)}$.

In each group, we can find the lowest high bit depth value and lowest high bit depth value as $$v_{g,j}^H = \max\{K \cdot \lfloor (v_{(m,n),j}^H / K) + 1 \rfloor, \forall (m,n,j) \in \Psi_{g,j}\}$$

$$v_{g,j}^L = \min\{K \cdot \lfloor v_{(m,n),j}^L / K \rfloor, \forall (m,n,j) \in \Psi_{g,j}\}.$$

Similarly, in other embodiments, the $\Psi_{g,j}$ groups may be constructed by first sorting the $\beta_{c,j}$ and $\gamma_{c,j}$ values and then creating appropriate groupings.

Alternative Clustering Schemes

In another embodiment, each frame is partitioned from the beginning into G non-overlapping regions. Then, each group-reshaping function is designed based on the characteristics of each one of the G regions.

In another embodiment, each frame is partitioned into P sub-regions, where P is larger than G. One may compute $\alpha_{c,j}$, $\beta_{c,j}$, and/or $\gamma_{c,j}$ values for each of the P sub-regions. If two such sub-regions have similar (e.g., within predefined thresholds) $\alpha_{c,j}$, $\beta_{c,j}$, or $\gamma_{c,j}$, then they can be merged. Sub-regions may be merged until there are only G sub-regions left.

Forward Reshaping Based on A Metric of Perceptual Noise

In the '925 Application, reshaping is performed using content-adaptive quantization according to the sensitivity of the human visual system to noise. First, for each pixel, a level of acceptable perceptual noise is determined. Then, these noise levels are arranged into M bins, and finally the quantization or reshaping for each pixel is determined according to the characteristics of each of the M bins. Let $H_{(m,n),j}(x,y)$ denote the noise level associated with each pixel $v_{(m,n),j}(x,y)$. Then, in each coded region $L_{(m,n),j}$, let $$b_{(m,n),j}(q) = \min\{H_{(m,n),j}(x,y) | (x,y) \in L_{(m,n),j}\} \quad (10)$$

denote the minimum acceptable noise level in each bin q.

Given G coded regions, for group g, let $$b_{g,j}(q) = \min\{b_{(m,n),j}(q) | L_{(m,n),j} \in \Psi_{g,j}\} \quad (11)$$

denote the minimum acceptable noise level for all coding regions that are assigned to this group.

Given $\{b_{g,j}(q)\}$ values for all bins, one then can construct forward and backward reshaping functions for group $\Psi_{g,j}$ as discussed in the '952 Application. Each of these reshaping functions will be associated with a group ID g=0, 1, . . . , G−1. Groups may be constructed using clustering techniques similar to those discussed earlier, e.g., by sorting $b_{(m,n),j}(q)$ values or by merging sub-regions which have similar $b_{(m,n),j}(q)$ values. For example, in an embodiment, let, without limitation, $$SIM(L_{(m,n),j}, L_{(m',n'),j}) = \sum_{q=0}^{M-1} |b_{(m,n),j}(q) - b_{(m',n'),j}(q)| \quad (12)$$

denote a measure of similarity between two blocks in terms of their corresponding noise values, and let $$SIM(L_{(m,n),j}, \Psi_{g,j}) = \sum_{q=0}^{M-1} |b_{(m,n),j}(q) - b_{g,j}(q)| \quad (13)$$

denote a measure of similarity between block (m,n) and a representative block in group g in terms of their corresponding noise values. Then, Table 4 provides in pseudo code an example process for determining the G groups.

Table 4: Grouping of reshaping functions in content-adaptive reshaping

```
// Initialization
Ψ_{0,j}=0;
G=1;
b_{0,j}(q)=min{b_{(0,0),j}(q)|L_{(0,0),j}∈Ψ_{0,j}}
// for each block
for all possible (m,n) regions except region (0,0)
    // STEP 1: calculate the similarity from current block to
       all existing groups
    for (g=0; g<G; g++)
        measure SIM(L_{(m,n),j}, Ψ_{g,j})
    end
    // STEP 2: find the most similar one
```

$$\hat{g} = \underset{g}{\arg\min}\{SIM(L_{(m,n),j}, \Psi_{g,j})\}$$

```
    // STEP 3: if the similarity is close enough; include this
       block into the group
    if (SIM(L_{(m,n),j}, Ψ_{ĝ,j})<Δ)
        Ψ_{ĝ,j}=Ψ_{ĝ,j}∪(m,n)
    else // create another group
        G++;
        ĝ=G
        Ψ_{ĝ,j}=(m,n)
    end
    // STEP 4: update group
    b_{ĝ,j}(q)=min{b_{(m,n),j}(q)|L_{(m,n),j}∈Ψ_{ĝ,j}} for all q
end
```

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to in-loop adaptive reshaping processes, such as those described herein. The computer and/or IC may compute any of a variety of parameters or values that relate to the in-loop adaptive reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to in-loop adaptive reshaping processes as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to efficient in-loop adaptive reshaping processes are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for in-loop converting image data between an input bit depth and a target bit depth in an encoder, the method comprising:
    accessing an input image in the input bit depth;
    dividing the input image into coding regions;
    for each coding region of the input image in the input bit depth:
        generating or selecting a forward reshaping function and a backward reshaping function for the coding region, wherein the forward reshaping function is configured to convert image data in the input bit depth to the target bit depth, wherein the backward reshaping function is configured to convert image data in the target bit depth to the input bit depth, and wherein the target bit depth is lower or equal to the input bit depth;
        accessing reference data in the input bit depth, the reference data being pixel data from a previously coded region;
        applying the forward reshaping function to the reference data and to pixel data of the coding region to generate second reference data and second coding region pixel data in the target bit depth;
        encoding with an encoder the second reference data and the second coding region pixel data to generate a coded bit stream in the target bit depth;
        generating, using the encoder, reconstructed data based on an in-loop decoding of the coded bit stream; and
        applying the backward reshaping function to the reconstructed data to generate future reference data in the input bit depth, the future reference data being stored in a frame buffer to be used as reference data in the coding of future coding regions.

2. The method of claim 1, further comprising, for each coding region of the input image in the input bit depth, multiplexing the coded bit stream with metadata characterizing the forward reshaping function and/or the backward reshaping function.

3. The method of claim 1, wherein encoding with an encoder the second reference data and the second coding region data to generate a coded bit stream in the target bit depth further comprises:
    performing intra or inter prediction based on the second reference data and the second coding region data to generate prediction data.

4. The method of claim 1, wherein encoding with an encoder the second reference data and the second coding region data to generate a coded bit stream in the target bit depth comprises:
    performing intra or inter prediction based on the second reference data and the second coding region data to generate prediction data;
    applying a coding transform to the prediction data to generate transformed prediction data;
    applying quantization to the transformed prediction data to generate quantized data; and
    applying entropy encoding to the quantized data to generate the coded bit stream.

5. The method of claim 4, wherein generating the reconstructed data based on in-loop decoding of the coded bit stream, further comprises:
    applying an inverse quantization to the quantized data to generate inverse-quantized data;
    applying an inverse transform to the inverse-quantized data to generate estimated prediction data; and generating the reconstructed data based on the estimated prediction data.

6. The method of claim 1, wherein generating or selecting a forward reshaping function and a backward reshaping function to the coding region further comprises:
   clustering the coding regions into G groups, wherein G is larger than two and smaller or equal than the total number of the coding regions;
   generating a forward reshaping function and a backward reshaping function for each one of the G groups; and
   selecting for the coding region one of the G sets of forward and backward reshaping functions according to a selection criterion.

7. The method of claim 6, wherein clustering the coding regions into G groups further comprises:
   computing a function of pixel values in each coding region to generate coding region metrics;
   sorting the coding regions metrics; and
   generating the G groups based on the sorted coding region metrics.

8. The method of claim 7, wherein a coding region metric is one of the minimum pixel value in the coding region, the maximum pixel value in the coding region, or a function of the minimum and maximum pixel values in the coding region.

9. The method of claim 7, wherein a coding region metric is one of the average, the variance, the standard deviation, or the entropy of pixel values in the coding region.

10. The method of claim 6, wherein clustering the coding regions into G groups further comprises:
    computing a function of pixel values in each coding region to generate coding region metrics; and
    assigning two coding regions into the same group if their corresponding coding region metrics are similar according to a similarity criterion.

11. An apparatus comprising a processor and configured to perform the method recited in claim 1.

12. A non-transitory computer-readable storage medium having stored thereon computer-executable instruction for executing a method with one or more processors in accordance with claim 1.

13. A method for backward in-loop converting image data between a target bit depth and an output bit depth in a decoder, the method comprising:
    accessing a coded bitstream in the target bit depth;
    accessing data characterizing a forward reshaping function and/or a backward reshaping function for each coded region in the coded bitstream, wherein the forward reshaping function is configured to convert image data in the output bit depth to the target bit depth, wherein the backward reshaping function is configured to convert image data in the target bit depth to the output bit depth, and wherein the target bit depth is lower or equal to the output bit depth;
    for each coded region in the coded bitstream:
        assigning a forward reshaping function and a backward reshaping function for the coded region;
        accessing reference data in the output bit depth, wherein the output bit depth is larger or equal to the target bit depth, the reference data being pixel data from a previously decoded region;
        applying the forward reshaping function to the reference data to generate second reference data in the target bit depth;
        generating, using a decoder, decoded pixel data in the target bit depth for the coded region based on the coded bitstream data and the second reference data; and
        applying the backward reshaping function to the decoded pixel data to generate output data and future reference data in the output bit depth, the future reference data being stored in a frame buffer to be used as reference data in the decoding of future coded regions.

14. The method of claim 13, wherein generating decoded pixel data for the coded region based on the coded bitstream data and the second reference data further comprises:
    applying inter or intra decoding to the coded bitstream based on the second reference data.

15. The method of claim 14, wherein applying inter or intra decoding further comprises:
    applying entropy decoding to the coded bitstream data to generate entropy decoded data;
    applying inverse quantization to the entropy decoded data to generate inverse quantized data;
    applying an inverse transform to the quantized data to generate inverse transformed data; and
    combining the inverse transformed data and the second reference data to generate the decoded pixel data.

* * * * *